(12) United States Patent
Robertson

(10) Patent No.: US 7,268,670 B2
(45) Date of Patent: Sep. 11, 2007

(54) POWER LINE COMMUNICATIONS SYSTEM

(75) Inventor: Mark Patrick Robertson, Edinburgh (GB)

(73) Assignee: The Autonomous Well Company, Ltd., Glasgow (GB)

( * ) Notice: Subject to any disclaimer, the term of this patent is extended or adjusted under 35 U.S.C. 154(b) by 0 days.

(21) Appl. No.: 10/451,751

(22) PCT Filed: Dec. 20, 2001

(86) PCT No.: PCT/GB01/05677

§ 371 (c)(1),
(2), (4) Date: Sep. 16, 2003

(87) PCT Pub. No.: WO02/51025

PCT Pub. Date: Jun. 27, 2002

(65) Prior Publication Data

US 2004/0201493 A1    Oct. 14, 2004

(30) Foreign Application Priority Data

Dec. 21, 2000  (GB) ................................. 0031393.2

(51) Int. Cl.
G05B 11/01    (2006.01)

(52) U.S. Cl. ............. 340/310.11; 340/310.12; 340/310.15; 340/310.16; 340/310.17

(58) Field of Classification Search ........... 340/310.01, 340/310.06, 310.07, 310.11, 310.12, 310.15, 340/310.16, 310.17
See application file for complete search history.

(56) References Cited

U.S. PATENT DOCUMENTS 3,657,478 A * 4/1972 Andrews, Jr. ............. 178/63 E
3,728,582 A * 4/1973 Agnew ........................ 361/48

* cited by examiner

*Primary Examiner*—Julie Bichngoc Lieu

(57) ABSTRACT

A power line communications technique (PLC) is disclosed which allows communications across any three phase electric system by modulating the impedance through earth between any two points of differing voltage on the electrical system in order to use the power supply as the communications power source thereby using the power supply current as the communications carrier. No additional coupled communications source is required and modulation of an earth link current at the power frequency is especially suitable for remote electrical loads, such as an oil well electric submersible pump, where it is most cost effective to only have the three power conductors and no neutral nor signal wires in the power cable. Embodiments of the invention are described.

29 Claims, 4 Drawing Sheets

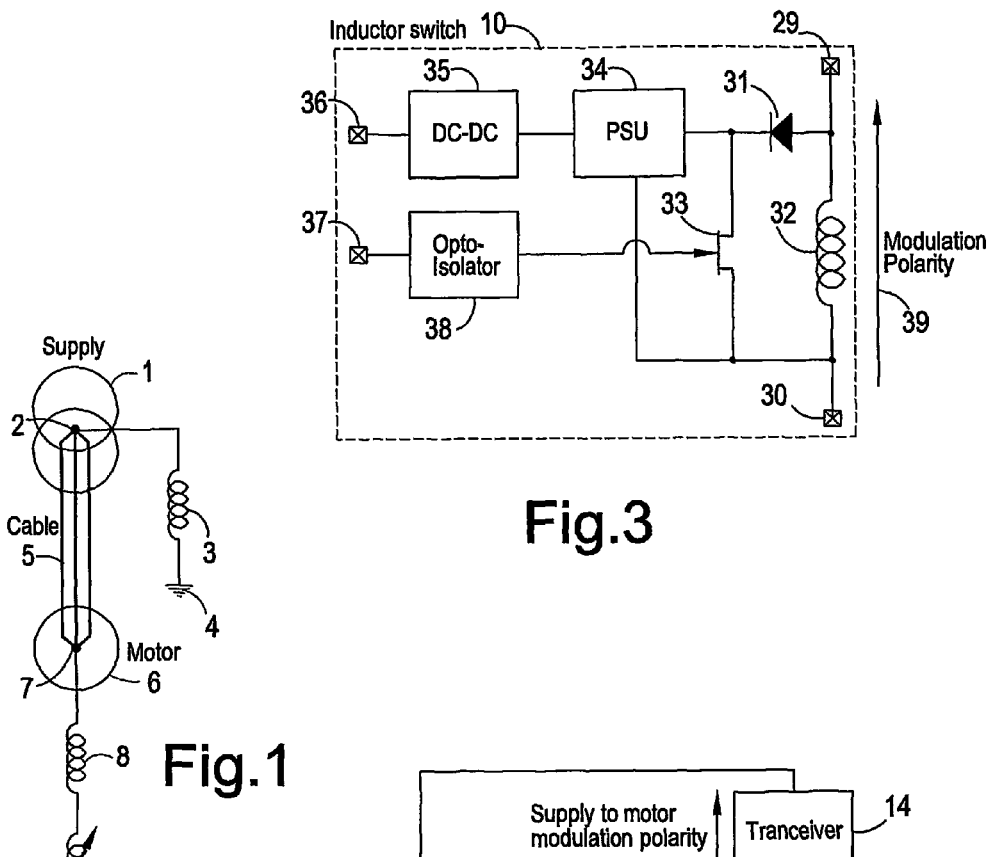
Fig.3
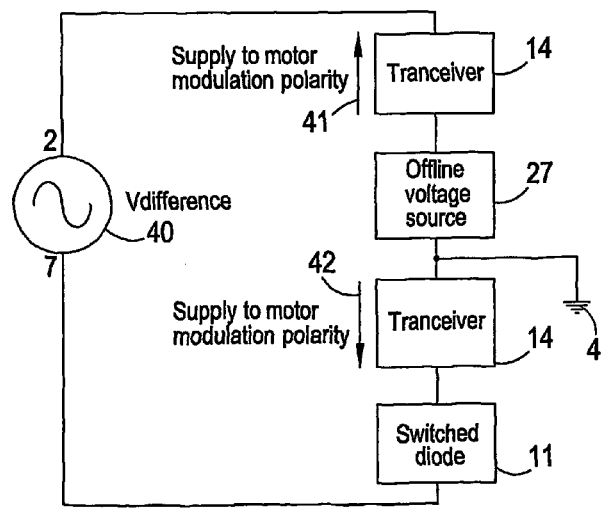
Fig.1
Fig.4

POWER LINE COMMUNICATIONS SYSTEM

FIELD OF THE INVENTION

The present invention relates to a power line communication (PLC) system, wherein information is transmitted along a power conductor. The invention is particularly suitable for oil wells and general purpose waterlift pumps, where a load such as an electric submersible pump (ESP) is installed deep in an oil well, bore hole or caisson and where the remoteness of the load results in a technical and commercial obstacle to installing a separate communication cable.

BACKGROUND OF THE INVENTION

Within power line communication systems there is provided a 3 phase power supply to power a load. If this supply were to power a perfectly balanced load the voltage between the neutral point of the supply and the neutral point of the load would be 0 volts. Subsequently, if both the supply neutral and the load neutral were connected using a neutral wire or both were connected to earth, then the current flow in this neutral or earth link would be 0 amps.

However, electrical systems are not perfectly balanced and for a motor powered over a long cable with various junction boxes and connectors, each phases impedance will be affected by a multitude of factors, such as: the length of the cable, the connection resistance, the position of the winding in the slot, the differences in winding lengths, the construction of the motor, the construction of the cable and the transposition of the cable. Such imbalances in a load create a voltage difference between the two neutral points and as current flow between the two neutrals is undesirable as it will cause a loss of power and they are not typically connected.

Power line communication systems are well known in the art. One such known system provides a means of communicating data from a remote inductive electrical load, such as a motor by modulating the motor current. However this type of system may require the need for modifying the motor windings.

Other existing PLC methods which use earth link currents, use a DC coupled current to act as the communication carrier. This however requires a large coupling package at both the supply and the load neutral connection, which are designed to remove signals above a few Hertz to remove the known imbalance voltage differences and as such limits the data transfer rate to a few bits per second. Furthermore, these types of coupled signals also suffer from the fact that they transfer less power to the transmitter.

It is an object of at least one aspect of the present invention to obviate or mitigate one or more of the aforementioned problems and disadvantages.

SUMMARY OF THE INVENTION

According to one aspect of the present invention there is provided a method of communicating information along a power conductor between a power supply and a load supplied by said power supply, said method comprising the steps of causing a flow of current from the power supply between two different locations within the power system through a reference conductor not required for normal operation of the power system, and modulating the flow transmitted through the reference conductor by varying an impedance placed in the path of said current flow to provide at least two current states which are used to transmit information along the power system.

Preferably the method uses earth as the reference conductor.

According to a second aspect of the present invention there is provided a power line communication system for use with a 3 phase power supply system said power line communication system comprising:

a 3 phase power supply, a 3 phase load, incorporating a 3 phase power conductor to connect the 3 phase actual load to the 3 phase power supply, a transmitter impedance means coupled between said load and a voltage reference conductor, said transmitter impedance being variable between at least a first impedance value and a second impedance value to generate a respective first and second current value, said first and second current values being used to transmit information along said reference conductor, a receiver impedance means coupled between said power supply and said voltage reference conductor, said receiver impedance completing the transmission circuit and permitting the measurement of the current state.

Preferably, said 3 phase supply has a neutral connection and said 3 phase load has a neutral connection, and at least one transmitter is coupled at one of said neutral connections and at least one receiver is coupled to the other of said neutral connections, said at least one transmitter and said at least one receiver being powered by a normally occurring voltage differential between the supply neutral connection and the load neutral connection for providing communication signals.

Preferably the first and second current values differ in amplitude only.

Alternatively any standard modulation technique including amplitude modulation, frequency modulation or phase modulation may be implemented to achieve the variation of current flow through the reference conductor.

Preferably the reference conductor is earth.

Conveniently the reference conductor may be a conductor insulated from earth.

Preferably the receiver impedance is connected between a neutral connection of the power supply and the reference conductor.

Alternatively the receiver impedance may be connected between any point of the power supply and the reference conductor.

Preferably the transmitter impedance is connected between a load neutral point, such as a star connection of a three phase motor and the reference conductor.

Alternatively the transmitter impedance may be connected between any point of the load and the reference conductor.

Most preferably there is provided a line powered transceiver at the load end and the supply end of the power system, both of which conveniently incorporate a fixed and variable impedance enabling duplex communication.

Preferably one transceiver transmits during one half cycle of a reference conductor current flow and the other transceiver on the other half cycle to achieve duplex communications.

Conveniently, there is provided a sensing device that enables information to be received from another transceiver by measurement of reference conductor current.

Advantageously an offline voltage source is provided in conjunction with one transceiver, enabling communication to be maintained when the power supply is not powered.

Conveniently, there is also provided a switched diode at the load transceiver, permitting insulation testing of the load and the apparatus connected at the load end of the power system.

Preferably the transceivers are powered by the normally occurring voltage differential between the supply neutral connection and the load neutral connection.

Advantageously there is provided means or a method to create a sufficient voltage differential to power the line transceivers and thereby allow communications between them.

Conveniently, the voltage differential between the supply neutral connection and load neutral connection may be created by use of a variable impedance placed in at least one conductor of the power line. Wherein the variable impedance is used to create an imbalance in the load, said impedance providing a means for controlling the potential difference exhibited between the supply neutral and load neutral.

Advantageously there is provided a control system that allows the impedance to be varied either manually, or by means of an automatic feedback system, in order to be able obtain the desired voltage differential exhibited between the supply neutral and load neutral.

Alternatively, the transceivers are powered by a voltage differential is created across the communication system by connecting the supply transceiver to one of the supply phases of the power source whilst the load transceiver is connected to the load neutral connection.

Alternatively, the transceivers are powered by a voltage differential is created across the communication system by connecting the load transceiver to one of the phases of the load whilst the supply transceiver is connected to the supply neutral connection.

Conveniently, the transceivers may be powered by a voltage differential is created across the communication system by connecting the supply transceiver to one of the supply phases of the power source and by connecting the load transceiver to a different phase at the load end.

Alternatively, the transceivers are powered by a phase conductor voltage drop, which is achieved by connecting the transceivers at either end of a conductor of the power line.

Advantageously the transceivers are powered by the voltage differential between any two points in the power system.

Advantageously the load insulation impedance may be determined by measurement of the reference conductor current flow.

BRIEF DESCRIPTION OF THE DRAWINGS

These and other aspects of the present invention will now be described by way of example with reference to the accompanying drawings, in which:

FIG. 1 is a three phase power system with a fixed supply neutral-earth impedance and a variable motor neutral-earth impedance;

FIG. 3 is an electrical diagram of an individual inductor switch shown in FIG. 2;

FIG. 4 is an electrical block diagram of the system shown in FIG. 2;

DETAILED DESCRIPTION OF THE PREFERRED EMBODIMENTS

Figure 2:
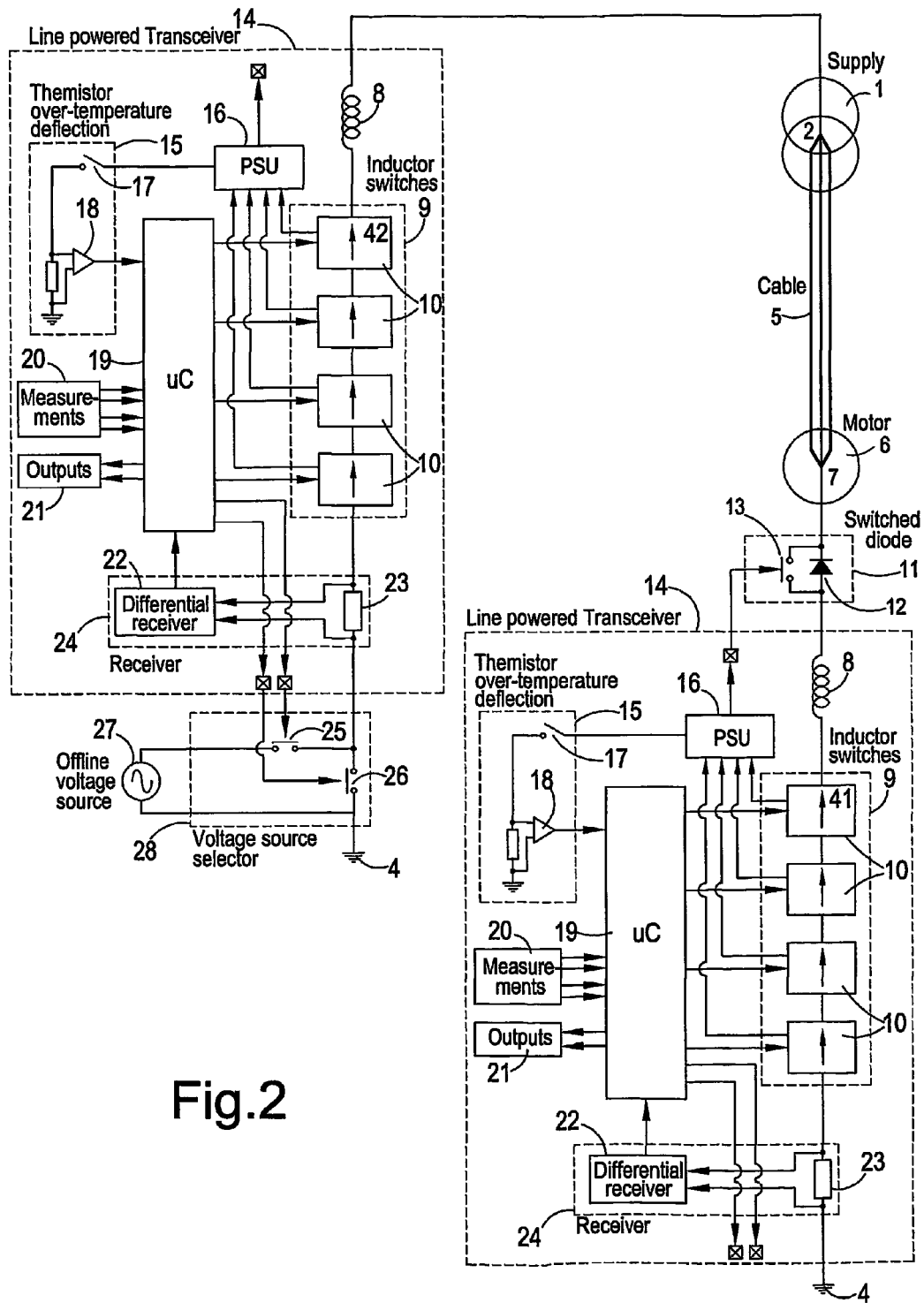
FIG. 2 is a duplex transmission system using a modulated neutral current driven by a differential voltage between the supply and motor neutral points.

Referring to FIG. 1 there is shown a three phase, power source 1 supplying a remote motor 6 through a substantial length of power cable 5. The power source 1 having a neutral point 2 which is connected to an earth point 4 through a fixed value inductance 3. Whilst the motor 6 is connected in a star configuration creating a motor neutral point 7 which is connected to earth via a fixed inductance 8 and a variable inductance 9.

The voltage seen at the neutral point of the power supply 2 and the neutral point of the motor 7 are not equal. This is due to resistances in each conductor of the power cable 5, and the general construction details of the motor 6, which means the load is not perfectly balanced and hence will result in a voltage differential between the supply neutral connection and the load neutral connection. This resultant voltage is applied across the three inductors 3,8,9 via earth which results in a current flow through the inductors via earth, where Ohm's law dictates the value of current $$current = voltage/impedance$$

where $$impedance = fixed\ impedance + variable\ impedance.$$

Therefore, by variation of the variable impedance 9 it is possible to vary the current through the circuit.

Switching a short circuit across the variable impedance 9 results in the variable impedance 9 changing between a short circuit and a fixed impedance. This results in the current changing between one of two states. These two states being used to send a single bit of information.

The resultant current measured through the fixed inductance 3 varies depending on the total circuit loop impedance. By measuring this current, the current can be categorised as either being low or high, indicating a low short circuited impedance or high impedance. The value of the current high or low being the state of a single bit of transmitted information.

Referring to FIG. 2 there is shown a diagram for a duplex, digital communications system having a data transfer rate of 200 bits per second, for a power frequency of 50 Hertz, the bandwidth being split into 100 bits per channel. The three phase power supply 1 is connected to a star connected motor load 6 over a substantial length of power cable 5, with a transceiver connected between the power supply neutral 2 and earth 4, and another transceiver connected between the motor star point 7 and earth 4. The transceiver connected at the power supply end also has an offline power supply 27 attached to it, whilst the transceiver connected at the motor end has a switched diode 11 connected in series between the motor neutral 7 and the transceiver.

The offline power supply 27 provides power to the communications system, that is both transceivers when the motor is not supplied with power from the power source 1. When the motor is powered, relay 26 is closed and relay 25 is open, thereby disconnecting the offline power supply 27. However, when the motor is off, the relays 25 and 26 are in the opposite state thereby connecting the offline power supply 27.

The switched diode 11 permits insulation testing of the power supply 1, the cable 5 and the motor 6 by presenting a diode barrier 12 to the circuit when the relay 13 is opened. However the relay 13 is closed whenever the transceiver 14 is powered. When the power supply 1 is switched on the relay 13 is open and the diode 12 does not permit ac power to flow. However, the rectified current flowing through the inductor switches 10 generates power in the inductor switch power supply 34 which supplies power to the relay 13 via a dc-dc isolator 35 and common power supply 16. An alternative means of controlling the relay is to power the relay 13 directly from a secondary winding on the fixed inductor 8.

FIG. 3 shows the construction of the inductor switch 10 shown in FIG. 2. Across the main power terminals 29 and 30 is a fixed inductor 32. In parallel with this fixed inductor 32 is a diode 31 and transistor 33 which are in series with each other, this circuitry allows the current to bypass the fixed inductor 32 whenever the transistor 33 is turned on. The transistor 33 is switched on using an external signal 37 from a micro-controller 19 and the external signal 37 is connected to the transistor 33 via an opto-isolator 38. A power supply 34 generates the power requirements for the inductor switches 10 and also supplies power to the transceivers common circuitry. Power is derived from the voltage across the fixed inductor 32 and the power supplied from the inductor switch 10 to the transceiver 14 is isolated from the inductor switch power supply 34 using a dc-dc converter 35.

When the inductor switch control signal 37 is on, the inductor switch presents a nominal impedance when the applied voltage is in the direction of the modulation polarity 39. Whilst when the control signal 37 is off, the impedance of the fixed inductor 32 is presented across the terminals 29,30. This allows the control signal 37 to modulate the current flow through the inductor switch 10 such that it can transmit information.

The variable inductance 9 is made from a combinations of inductor switches 10, in this embodiment four such inductor switches have been used, which can be switched to set the impedance to any one of five values as detailed below in Table 1:

TABLE 1

| No of Inductor Switches ON | Transceiver Inductance | | Binary State |
| --- | --- | --- | --- |
| | +ve half cycle | -ve half cycle | |
| 0 | Zf + 4*Zv | Zf + 4*Zv | Null |
| 1 | Zf + 3*Zv | Zf + 4*Zv | 00 |
| 2 | Zf + 2*Zv | Zf + 4*Zv | 01 |

TABLE 1-continued

| No of Inductor Switches ON | Transceiver Inductance | | Binary State |
| --- | --- | --- | --- |
| | +ve half cycle | -ve half cycle | |
| 3 | Zf + 1*Zv | Zf + 4*Zv | 10 |
| 4 | Zf | Zf + 4*Zv | 11 |

Zf = fixed inductor 8 value
Zv = variable inductor 32 value

TABLE 2

| No of Inductor Switches ON | Loop Inductance | | Binary State |
| --- | --- | --- | --- |
| | +ve half cycle | -ve half cycle | |
| 0 | Zft + 4*Zvt + Zfr + 4*Zvr | Zft + 4*Zvt + Zr | Null |
| 1 | Zft + 3*Zvt + Zfr + 4*Zvr | Zft + 4*Zvt + Zr | 00 |
| 2 | Zft + 2*Zvt + Zfr + 4*Zvr | Zft + 4*Zvt + Zr | 01 |
| 3 | Zft + 1*Zvt + Zfr + 4*Zvr | Zft + 4*Zvt + Zr | 10 |
| 4 | Zft + Zfr + 4*Zvr | Zft + 4*Zvt + Zr | 11 |

Figure 5:
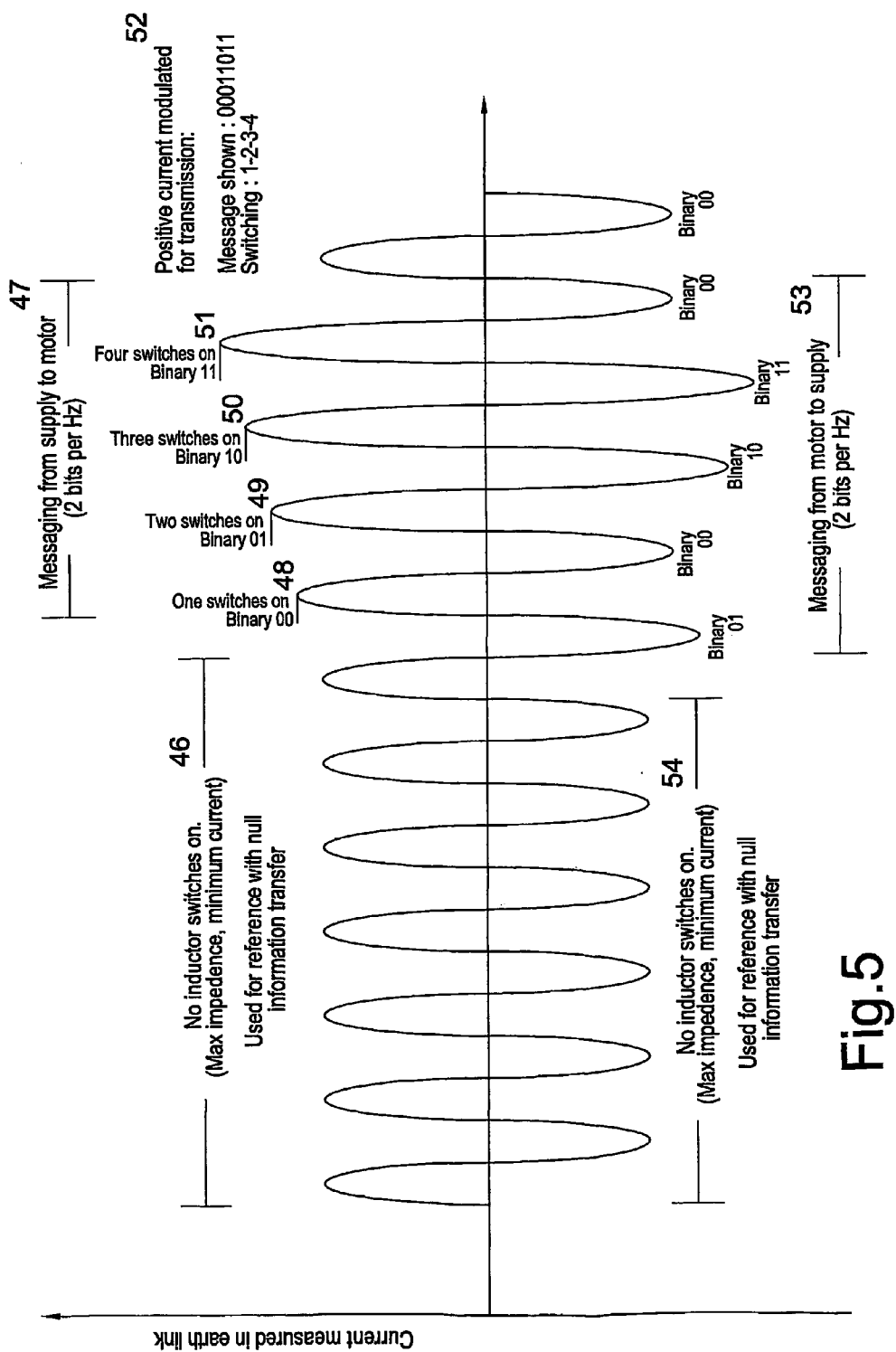
FIG. 5 is an amplitude modulated current waveform showing duplex digital communications at 2 bits per Hertz.

Zft = transmitter fixed inductor 8 value
Zvt = transmitter variable inductor 32 value
Zfr = receiver fixed inductor 8 value
Zvr = receiver variable inductor 32 value
Zr = receiver inductance fixed + variable It can be seen from the information detailed in table 1 above that five distinct transmission currents can be generated, this is also illustrated in FIG. 5. Reserving the state where all switches 10 are off as a null state, this leaves 4 transmission currents which allows 2 bits of information to be transferred by the variable impedance 9. FIG. 5 shows a message on the positive polarity cycle of binary 00011011, a signal which has been created by sequentially, on each positive half cycle switching on 1 then 2 then 3 then 4 of the inductor switches 10. The binary signal with a null, that is to say no inductor switches selected, preceding and following the signal, is decimal 27. The decimal value 27 is the information that the microcontroller 19 sends to the receiver to indicate that the thermistor over-temperature detection device 15 has signalled a high value into the microcontroller 19, or when the measurement device 20 has generated a signal that it has sent to the microcontroller.

Figure 6:
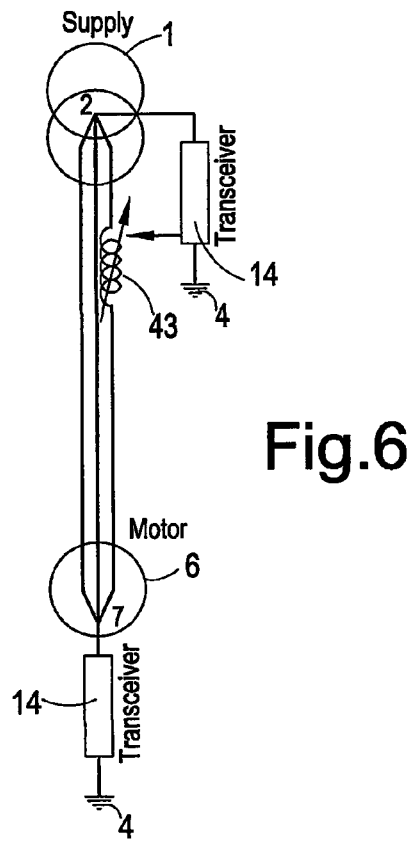
FIG. 6 is an electrical diagram showing a communications system in accordance with a second embodiment of the invention with a differential voltage controlled by variable line impedance.
Figure 7:
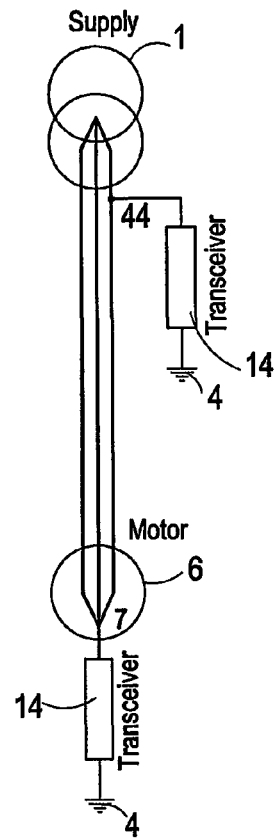
FIG. 7 is an electrical diagram of a communication system in accordance with a third embodiment of the invention showing a phase voltage used for the communications differential created by connecting the supply transceiver to one phase.
Figure 8:
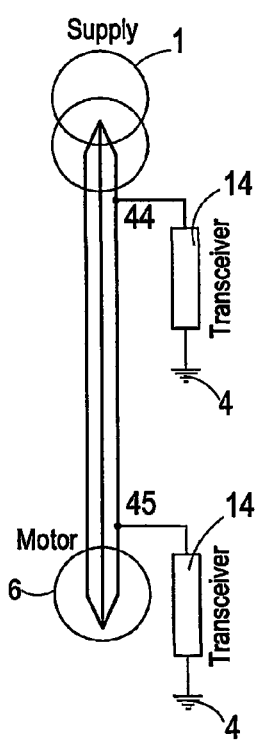
FIG. 8 is an electrical diagram of a communication system in accordance with a fourth embodiment of the invention showing a cable voltage drop used for the communications differential, created by connecting transceivers at either end of the cable.

The receiver for this message does not switch on the positive polarity; it is 180 degrees out of phase and the inductance of the transceiver acting as the receiver is fixed at Zf+4*Zv as listed in Table 2. Hence by measuring the lowest current through the transceiver the null signal value is known and by measuring the maximum current the changes in current between each of the transmitter states can be determined. This allows the receiver to recover the information in the current flow as transmitted by the opposing transceiver.

Where the voltage is insufficient to power the communications FIGS. 6, 7, 8 and 9 show alternative approaches. FIG. 6 adds a variable inductance 43 in one phase of the conductor to cause a load imbalance. FIG. 7 applies a phase voltage across the communication system by connecting the supply transceiver to one phase of the supply 44. FIG. 8 applies a phase conductor voltage drop across the transceiver by connecting the transceivers 14 at either end 44, 45 of the cable 5.

Figure 9:
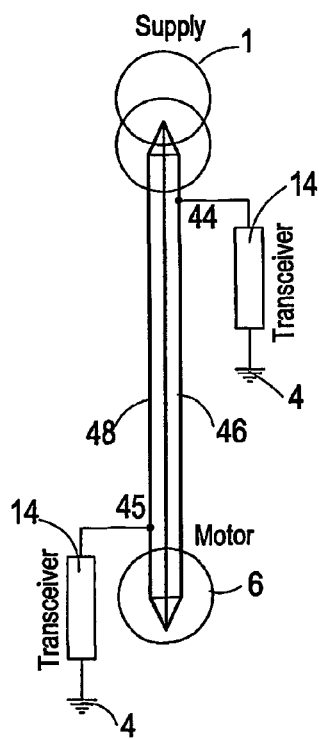
FIG. 9 is an electrical diagram of a communication system in accordance with a fifth embodiment of the invention showing both the supply and load being delta connected, in which a phase voltage differential is used for the communications differential, created by connecting one transceiver to a supply phase and the second transceiver to a different phase at the load.

FIG. 9 shows delta connected supply and load where a phase to phase voltage difference is applied across the communication system by connecting one transceiver to one phase 46 of the supply 44 and the second transceiver to another phase 48 at the motor end 45. Other approaches to generating this communications voltage are possible. It will be understood that the voltage reference conductor may be a separate conductor.

To send information in the opposite direction is the same as described hereinabove.

The primary advantages of the present invention over those of existing systems is that the present invention removes the need to run a separate communication cable to the remote load and does not require the coupling of a communication power supply or signal to the 3 phase power system.

Other advantages are that the modulated current is not the motor current, but a much smaller earth link current thus improving the signal to noise ratio. Also by utilising the power supply as the carrier for the transmission system, this provides a greater amount of power available for the transmitter electronics compared to systems that use a coupled supply. Likewise, because there is no coupling it is possible to modulate the earth link current at a high rate, thus allowing a high data transfer rate to be achieved. A further advantage is that with the embodiments hereinbefore described the data rate transfer is greater or equal to the motor frequency, that is 50 bits pe second for 50 Hz, and is also independent of any oscillations or changes in the motor current.

The invention claimed is:

1. A method of communicating information along a power conductor between a power supply and a load supplied by said power supply, said method comprising the steps of causing a flow of supply current from the power supply between two different locations within the power system through a reference conductor not required for normal operation of the power system, and modulating the flow transmitted through the reference conductor by varying an impedance placed in the path of said current flow to provide at least two current states which are used to transmit information along the power system.

2. A method as claimed in claim 1 wherein the method uses earth as the reference conductor.

3. A power line communication system for use with a 3-phase power supply system said power line communication system comprising:
   a 3-phase power supply,
   a 3-phase load, incorporating a 3-phase power conductor to connect the 3-phase actual load to the 3-phase power supply,
   a transmitter impedance means coupled between said load and a voltage reference conductor, said transmitter impedance means being variable between at least a first impedance value and a second impedance value to generate a respective first and second current value, said first and second current values being used to transmit information along said reference conductor,
   a receiver impedance means coupled between said power supply and said voltage reference conductor, said receiver impedance means completing a transmission circuit and permitting the measurement of the current state.

4. A system as claimed in claim 3 wherein said 3-phase supply has a neutral connection and said 3-phase load has a neutral connection, and at least one transmitter is coupled at one of said neutral connections and at least one receiver is coupled to the other of said neutral connections, said at least one transmitter and said at least one receiver being powered by a normally occurring voltage differential between the supply neutral connection and the load neutral connection for providing communication signals.

5. A system as claimed in claim 4 wherein said receiver and said transmitter each comprise a transceiver coupled to said supply and load neutral connections.

6. A system as claimed in claim 3 wherein the first and second current values differ in amplitude only.

7. A system as claimed in claim 3 wherein any standard modulation technique including amplitude modulation, frequency modulation and phase modulation is implemented to achieve variation of current flow through the reference conductor.

8. A system as claimed in claim 3 wherein the reference conductor is earth.

9. A system as claimed in claim 3 wherein the reference conductor is a conductor insulated from earth.

10. A system as claimed in claim 3 wherein the receiver impedance is connected between a neutral connection of the power supply and the reference conductor.

11. A system as claimed in claim 3 wherein the receiver impedance is connected between any point of the power supply and the reference conductor.

12. A system as claimed in claim 3 wherein the transmitter impedance is connected between a load neutral point and the reference conductor.

13. A system as claimed in claim 3 wherein the transmitter impedance is connected between any point of the load and the reference conductor.

14. A system as claimed in claim 5 further comprising a line powered transceiver disposed at a load end and at a supply end of the power system, said load end and said supply end having a fixed and a variable impedance enabling duplex communication.

15. A system as claimed in claim 14 wherein a first transceiver transmits during one half cycle of a reference conductor current flow and a second transceiver on the other half cycle of said current flow to achieve duplex communications.

16. A system as claimed in claim 14 further comprising a sensing device that enables information to be received from a third transceiver by measurement of reference conductor current.

17. A system as claimed in claim 14 further comprising an offline voltage source in conjunction with one of said first and second transceivers to enable communication to be maintained when the power supply is not transmitting power.

18. A system as claimed in claim 14 further comprising a switched diode at the load transceiver to permit insulation testing of the load and an apparatus connected at the load end of the power system.

19. A system as claimed in claim 14 wherein the transceivers are powered by a normally occurring voltage differential between the supply neutral connection and the load neutral connection.

20. A system as claimed in claim 14 further comprising means to create a sufficient voltage differential to power the line transceivers and thereby allow communications between them.

21. A system as claimed in claim 20 wherein said voltage differential creating means is a variable impedance placed in at least one conductor of the power line.

22. A system as claimed in claim 21 wherein the variable impedance is used to create an imbalance in the load, said variable impedance providing a means for controlling a potential difference exhibited between the supply neutral and load neutral.

23. A system as claimed in claim 20 wherein the voltage differential is created across the communication system by connecting the supply transceiver to one of the supply phases of the power source while the load transceiver is connected to the load neutral connection.

24. A system as claimed in claim 20 wherein the voltage differential is created across the communication system by connecting the load transceiver to one of the supply phases of the load while the supply transceiver is connected to the supply neutral connection.

25. A system as claimed in claim 20 wherein the voltage differential is created across the communication system by connecting the supply transceiver to one of the supply phases of the power source and by connecting the load transceiver to a different phase at the load end.

26. A system as claimed in claim 20 wherein the transceivers are powered by a phase conductor voltage drop which is achieved by connecting the transceivers at either end of a conductor of the power line.

27. A system for communicating information along a power conductor between a power supply and a load supplied by said power supply, said system being operable to cause a flow of supply current from the power supply between two different locations trough a reference conductor not required for normal operation of the power supply, and modulate the flow transmitted through the reference conductor by varying an impedance placed on the path of said current flow to provide at least two current states for transmitting information.

28. A system as in claim 3 wherein the load is located downhole.

29. A system as in claim 28 wherein the power supply is located on or above the earth's surface.

* * * * *